United States Patent

Viney et al.

Patent Number: 5,929,807
Date of Patent: Jul. 27, 1999

[54] METHOD AND APPARATUS FOR PRECISION LOCATION OF GPS SURVEY TILT POLE

[75] Inventors: Ian Timothy Viney, Christchurch; Philip Richard Jackson, Lyttleton, both of New Zealand

[73] Assignee: Trimble Navigation Limited, Sunnvale, Calif.

[21] Appl. No.: 08/813,646

[22] Filed: Mar. 7, 1997

[51] Int. Cl.[6] .............................. G01S 5/02; H04B 7/185
[52] U.S. Cl. ...................................................... 342/357.06
[58] Field of Search ............................................. 342/357

[56] References Cited

U.S. PATENT DOCUMENTS

| 4,754,553 | 7/1988 | Simpson | 33/33 C |
| 5,512,905 | 4/1996 | Nichols et al. | 342/357 |

OTHER PUBLICATIONS

Trimble Navigation, Site Surveyor Real Time GPS Survey System, Oct. 1992.

*Primary Examiner*—Gregory C. Issing
*Attorney, Agent, or Firm*—Blakely, Sokoloff, Taylor & Zafman LLP

[57] ABSTRACT

A method of recording position data for measuring the position of a ground point during a survey procedure in which satellite signals are used to determine the position of an antenna on a range pole. The pole is moved through non-vertical orientations by an operator so that the antenna position is determined at various points which generally do not lie directly over the ground point. The antenna positions lie on a geometric figure, generally the surface of a sphere which is centered on the ground point and has a radius equal to the length of the pole. Characterizing the sphere by a statistical analysis of the antenna positions either in real time or during post processing, leads to an accurate measurement of the ground point position. The method is preferably enabled by an otherwise standard handheld controller device which operates as part of a roving antenna/receiver station. The satellite signals are preferably derived from the Global Positioning System although other systems may also be used.

23 Claims, 7 Drawing Sheets

METHOD AND APPARATUS FOR PRECISION LOCATION OF GPS SURVEY TILT POLE

BACKGROUND OF THE INVENTION

1. Field of the Invention

This invention relates to survey procedures, and in particular to satellite based positioning systems and a method of using a pole mounted antenna to measure the position of a ground point. The method is especially, though not only, suitable for use in kinematic surveying techniques where the position of a roving antenna/receiver can be obtained with an accuracy in the order of 2 cm or better.

2. Art Background

Traditional surveying involves two operators working with a theodolite and range pole, or a more complex optical electronic "total station". One operator generally positions the theodolite over a known control point while the other holds the range pole at a series of unknown points whose positions are to be determined. A prism mounted on the range pole is sighted through the theodolite and accurate angular and distance measurements to the prism are taken at each point. The positions of the points can then be determined by trigonometry.

An approximately analogous process takes place in modem satellite based surveying. Current techniques involve a reference antenna/receiver located over a known point and a single operator who moves about with a roving antenna/receiver, or "GPS total station". The operator stops on various unknown points to record position information in a data collector using signals transmitted by a minimum number of satellites which are above the horizon. The roving antenna is also carried atop a range pole which is held by the operator, although the roving antenna need not be within sight of the reference antenna. A vector or base line is determined from the reference site to the rover.

In real time techniques, an actual position is determined and recorded at each point during a survey. Other techniques require post processing, in which data from both the reference and roving receivers is recorded for analysis and determination of actual position coordinates later. Most techniques are also either differential or kinematic. In kinematic surveying at least four satellites must be in view of each antenna at all times and centimeter level accuracy can currently be obtained. Differential surveying allows satellites to be temporarily obscured by obstructions between measurement points, and can provide submeter accuracy, which is sufficient for many purposes. Actual positions are calculated as latitude, longitude and height with reference to the global ellipsoid WGS-84 (World Geodetic System 1984). Local northing, easting and elevation co-ordinates can then be determined by applying an appropriate datum transformation and map projection.

The satellite positioning system most commonly in use today is the Global Positioning System (GPS) although others such as the Global Orbiting Navigation System (GLONASS) are also in use or under development. Some land based systems which simulate satellite systems are also being developed. GPS is based on a constellation of twenty four satellites operated by the US Department of Defense. The satellite positions are monitored closely from earth and act as reference points from which an antenna/receiver in the field is able to determine position information. By measuring the travel time of signals transmitted from a number of satellites, the receiver is able to determine corresponding distances from the satellites to the antenna phase center, and then the position of the antenna by trilateration. A minimum number of satellites must be visible to the antenna above the horizon.

Surveyors require a position measurement for the ground point below the roving antenna (or below the prism in traditional procedures) rather than the position of the antenna itself. It is the ground point positions which are required when staking out an area for residential development, for example. However, it is not usually possible to place the antenna directly on the ground point because of signal reflection and satellite obstruction effects, and a separate measurement of the antenna height on the range pole must normally be made. The range pole must also be oriented vertically over the ground point for up to a minute. Experience has shown that manual mistakes made by surveyors when placing and orienting the pole are the most common source of error in satellite based surveying techniques. Departures of the pole from verticality over the ground point are particularly significant.

To reduce these errors in traditional surveying, and improve the reliability of survey measurements, two prisms are sometimes placed along the range pole so that a vector towards the ground point may be determined by the theodolite. The range pole must still be held immobile by the second operator for an appreciable period and the process is not particularly convenient. Use of two antennas in a similar fashion with satellite based techniques is also possible but cumbersome. Instead, most range poles currently incorporate a spirit level device or "bullseye bubble" to provide a visual check on verticality for the surveyor. These are susceptible to damage in the field, and surveyors are not necessarily vigilant throughout the dozens or possibly hundreds of points which are measured during a typical work period. Other poles may incorporate an electronic tilt sensor and compass to allow a check on verticality, but these are relatively expensive and the compass is subject to local magnetic influences.

SUMMARY OF THE INVENTION

It is therefore an object of the present invention to provide a method and apparatus for more reliably measuring the position of a ground point when using a pole mounted antenna in a satellite based surveying system. The position of the antenna is determined at a number of points which generally do not lie directly over the ground point, thereby avoiding the usual need to maintain the pole vertical and stationary during the measurement.

The surveyor or other operator, carrying an antenna/receiver mounted on a pole, places the bottom or contact end of the pole on a ground point and moves the pole through a range of orientations. This movement of the pole typically traces a cone at approximately arms length about a vertical line through the ground point, although there is no necessity to follow a particular pattern, and at least one approximately vertical orientation would normally be included. The antenna correspondingly moves and may be regarded as defining a geometric figure constrained by the length of the pole and the position of the ground point. In general the antenna follows a path on part of the surface of a sphere centered on the ground point. Recording position data for the antenna position at a plurality of separated pole angles enables the center of the sphere, and therefore the desired coordinates of the ground point, to be accurately located. Three or more measurements of the antenna position are required to determine the ground point, and given the limitations of currently available equipment, a measurement of the pole length must also be made.

Preferably a large number of antenna position measurements are recorded automatically by the roving survey equipment as the surveyor moves the range pole over a period of several seconds or longer, as necessary. Some receivers currently available are able to generate measurements at up to about 5 times per second so a surveyor need not be delayed appreciably longer at a particular site than existing single measurement methods. In some survey techniques the measurements will be analyzed in the field to provide a real time determination of the ground point position, while in others the equipment simply checks that a sufficient number of antenna positions have been recorded, and the data is stored for post processing. Analysis of the measurements to determine the center and radius of a sphere is readily carried out using a least squares regression algorithm, for example.

It will be appreciated that a method according to the invention may be used in a variety of surveying equipment and techniques, and with a variety of remote positioning systems, although the usual choice will be a satellite based system, preferably GPS. It will also be appreciated that a "ground point" is not necessarily literally on the ground, but could be on a fence post, rooftop, concrete foundation, or any other point of interest.

BRIEF DESCRIPTION OF THE DRAWINGS

Embodiments of the invention will be described with reference to the accompanying drawings, of which.

DETAILED DESCRIPTION

Figure 1A:
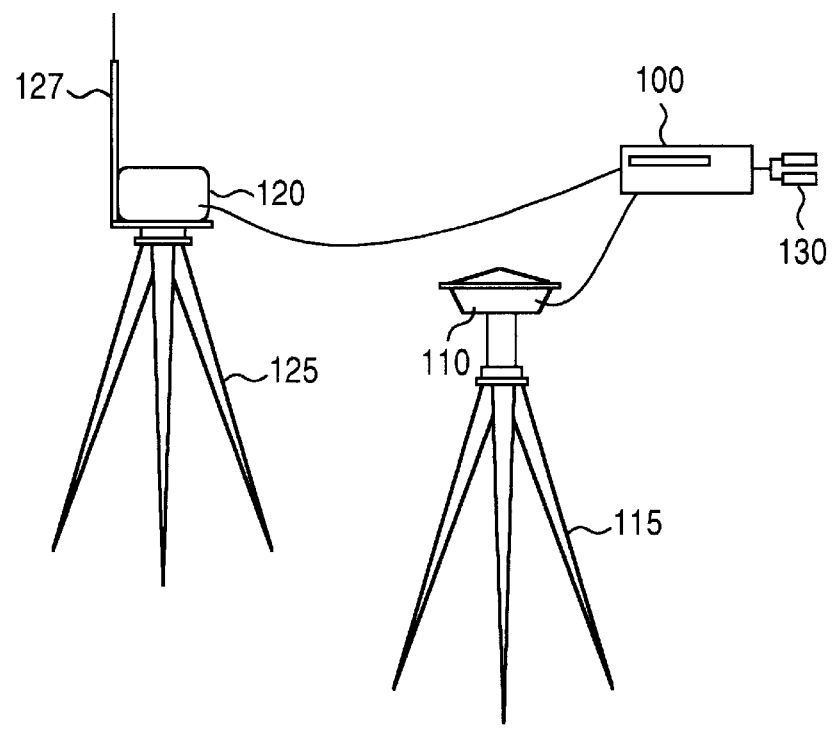
FIGS. 1a and 1b show typical base station and rover equipment which may be used in a satellite based survey process.

It will be appreciated the term that "surveying" includes, without limitation: topographic, geodetic, detail, stakeout, site checking, boundary and local control work. The present invention is potentially useful in all such aspects of surveying and in any other work which involves an operator who takes measurements with a range pole.

It will also be appreciated that the invention is potentially useful with any remote positioning system, whether satellite or land based, which is suitable for survey work. Satellite based systems include the global positioning system (GPS) and the global orbiting navigation system (GLONASS), while land based radio navigation systems which simulate a configuration of satellites might also be used. A detailed discussion of surveying techniques and remote positioning systems is beyond the scope of this specification which refers primarily to satellite based kinematic survey procedures, but without limitation.

It will be further appreciated that the invention may be implemented with a wide variety of survey related equipment and software which is available from a number of manufacturers. This includes items for use both in the field during a survey procedure and later in the office, when measurements are being analyzed in post processing, or for specific purposes such as mapping. The specification primarily describes equipment and software that are available from Trimble Navigation Limited, Sunnyvale, Calif. However, the present invention is not limited to such software and equipment. Operation manuals and other reference material provided by manufacturers are a generally helpful source of additional information on GPS, surveying and practical configurations of equipment.

This specification describes equipment in which the antenna, receiver and handheld data collector of a GPS total station are provided as separate items connected together by suitable cables. A typical stand alone receiver and data collector are the Trimble 4000 SSi™ and Trimble TDC1™, Survey Controller™ respectively. A data collector in this form provides a convenient interface by which an operator controls the receiver, stores position information, and may be guided through parts of a survey procedure. However, receivers can take many forms and may be incorporated within the antenna housing, as in the Trimble 4600™ for example, or within the data collector, by way of a PCMCIA (Personal Computer Memory Card International Association) card used in a laptop computer. These and other arrangements of the equipment are also within the scope of the invention without limitation.

Software which enables antenna position data to be recorded, and actual ground point positions to be determined during a real time technique, could be installed in a data collector, receiver, a data collector which includes a receiver, or like device. Current real time techniques can involve either kinematic or differential measurements as mentioned above. Software which enables the ground point positions to be determined at a later time, by analysis of raw position information stored in the field, may be installed in a conventional computer system, such as an office computer into which data is downloaded from a data collector or receiver. The positions may then be determined during otherwise standard post processing procedures, when using software such as Trimble GPSurvey™ for example. Analysis may also be carried out after post processing, during mapping procedures, using Trimble Trimmap™, also by way of example.

Figure 1B:
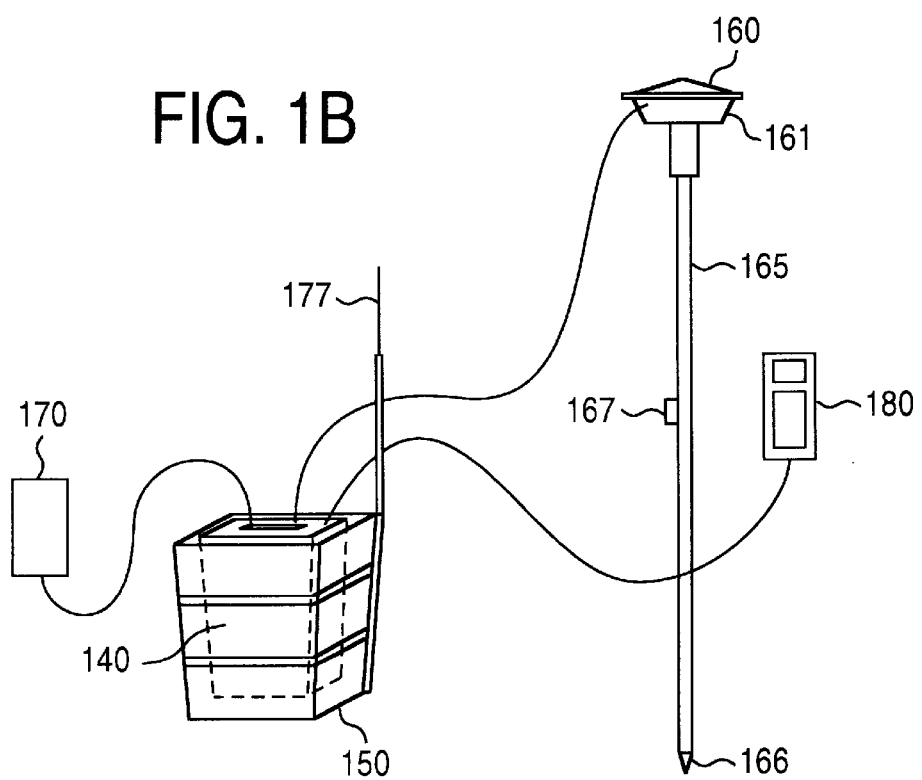

FIGS. 1a and 1b show typical equipment which might be used in the field during survey work, bearing in mind alternative arrangements such as those mentioned above. One or more reference base stations such as shown in FIG. 1a are set up at points having known or assumed coordinates. Each base station typically includes a satellite signal receiver 100 such as a Trimble 4000 Series, connected to a satellite antenna 110 mounted on tripod 115, and a mobile radio receiver/transmitter 120 mounted on tripod 125. The radio 120 operates through antenna 127, and rechargeable batteries 130 power both the radio and the receiver 100. Roving equipment such as shown in FIG. 1b typically includes an identical battery powered receiver 140 carried in a backpack 150, connected to satellite antenna unit 160 mounted on a range pole 165. A mobile radio receiver/transmitter 170 with antenna 177 is usually connected to the receiver 140 and carried in the backpack to enable real time processing of position data. A handheld survey controller 180, such as the Trimble TDC1™, is also usually connected to the receiver 140 and may be clipped to the backpack, the range pole, or carried in a hip pack.

It is generally the receivers 100 and 140 which carry out detailed analysis of the satellite signals to determine position data or actual position coordinates for the antenna, although alternative systems may be envisaged. It is generally the survey controller 180 with which a surveyor controls operation of the receiver 140 during a survey procedure, and is responsible for functions such as further analysis or storage of data, although these may be shared with or carried out also by the receiver. The controller generally has a keypad or other input facility through which the surveyor may input attribute information and commands, and a display on which measurement results such as actual coordinates and quality statistics or related items of information are presented.

Radio receivers/transmitters 120 and 170 form a telemetry system which is currently required for real time processing of kinematic and differential survey data to obtain accurate positions in local coordinates. The radio link transmits data required for real time calculations from the base receiver to the roving receiver, as the surveyor moves about a survey area which may include baselines many kilometers in length. It also allows each receiver to check that lock on the satellites is being maintained. Telemetry is not required in post processed surveys where satellite signal data is stored in both the base and roving receivers and is combined later during analysis in a separate computer to determine vectors from the base to the rover. However, any loss of lock by the reference receiver is not detected until the survey is completed, in which case a site may need to be revisited for additional measurements. Satellite signal data may be stored in either the survey controller or the roving receiver if required, for downloading later.

The range pole 165 has a contact end 166 which is placed on an unknown ground point to be measured. A bullseye or pill bubble 167 is often provided to assist vertical orientation of the pole over the ground point if required. The length of the range pole may be varied depending on the nature of the ground point, with the pole being shortened to place the contact point 166 on top of a fence post for example, or lengthened to place the antenna 160 clearly above the surveyor's head. Satellite distance measurements determine the antenna position and more specifically that of a phase center within the antenna housing 161, rather than that of the ground point directly. The distance between the phase center and the bottom of the housing is given for most types of antenna. This is added to a determination of the pole length between the antenna housing 161 and the contact end 166 which can normally be read from a scale on the pole, or made with a tape measure. The result is normally subtracted from the antenna elevation in determining the true ground point coordinates. Some other pole systems currently in use involve selection of a pole having a known fixed length or an electronic indication of a variable length. The error which can nevertheless sometimes arise in relation to verticality of the range pole is eliminated or at least reduced by manipulating the pole and processing the resulting data according to the invention.

Figure 2:
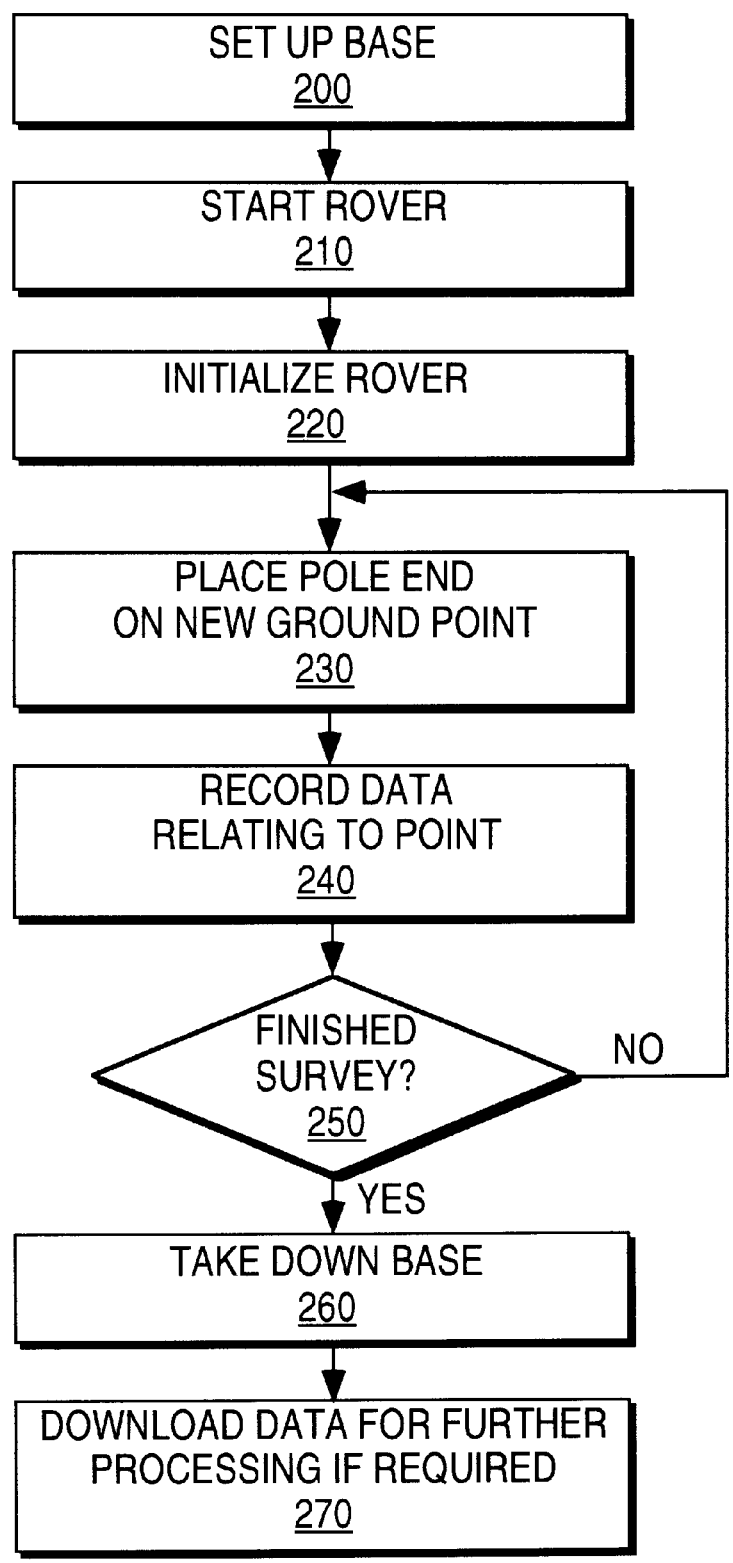
FIG. 2 indicates generally the steps taken by a surveyor in setting up the base station and determining the position of a series of unknown ground points using the rover.

FIG. 2 is a flow diagram indicating one embodiment of the course of events during a survey procedure using equipment as mentioned. In step 200 the surveyor first sets up a temporary base or reference station such as shown in FIG. 1a, with antenna 110 positioned over a control point having known coordinates in a local grid. The rover components are then assembled 210, which includes mounting antenna 160 on range pole 165 and connection of other components such as shown in FIG. 1b by way of example. A radio link between the base receiver 100 and a corresponding receiver 140 in backpack 150 is enabled between mobile radio units 120 and 170 if real time measurements are to be made. Survey controller 180 will typically prompt the surveyor for information relating to the local datum ellipsoid, map projection, and any horizontal or vertical adjustments required to convert WGS-84 latitude, longitude and height into local northing, easting and elevation values. It may also prompt for data relating to the antenna type and descriptive information relating to the survey time and area. Initialization 220 of the roving receiver is then required to achieve centimeter-level accuracy in real time work, and various procedures are used depending on the type of receiver and other requirements of the particular survey.

Figure 3:
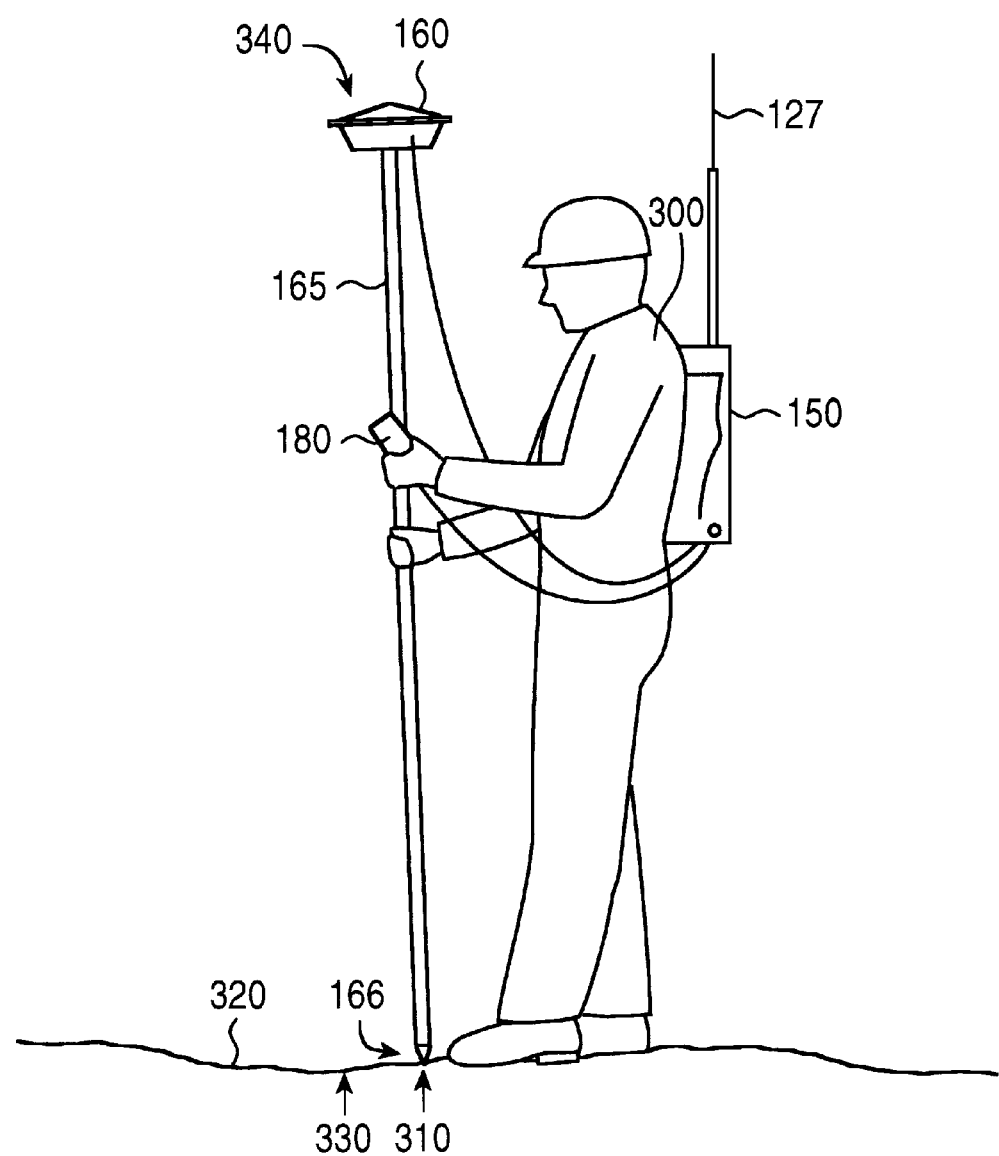
FIG. 3 shows a surveyor carrying the rover equipment and using a pole mounted antenna to record position data for a ground point.

During a survey the backpack 150 and range pole 165 are carried from one location to another, and contact end 166 of the pole is placed consecutively 230 on a series of unknown ground points, such as point 310 indicated in FIG. 3. Ordinarily the pole is positioned as near vertically over the ground point as possible so that a measurement of the position of antenna 160 translates to that of the ground point by a simple subtraction of the pole length from the elevation coordinate as mentioned above. The surveyor uses the keypad on the survey controller to initiate the position measurement and holds the pole immobile until the display indicates that sufficient precision has been achieved and the point may be recorded 240. If the length of the pole has been varied for the particular location then an observation of the length must be made and entered on the survey controller. Once the desired locations have been visited by vehicle or on foot, and recordal of the required position information has taken place, the survey is entered as finished 250 and the surveyor returns to dismantle the base station 260. Data is eventually downloaded 270 to another computer from the reference and roving receivers and/or the survey controller for post processing, further analysis, or mapping as required.

Under some circumstances an existing fixed base station may avoid any need for the operator set up a temporary station in step 200. A local authority may have a number of fixed stations throughout a district for example, from which a reference signal can be obtained, or a reference service provider may make a signal available on payment of a fee. Steps 200 and 260 in FIG. 2 may then be unnecessary.

FIG. 3 shows a surveyor 300, by way of example, in the process of placing a range pole 165 to measure the position of point 310 in an area of ground 320. The pole is perhaps two meters high. Four satellites 330 are also shown as part of a remote positioning system, which is preferably, though not necessarily, a satellite based system such as GPS mentioned above. At least four satellites must normally be present somewhere above the horizon, in suitable relative positions, for an accurate measurement of the position of the antenna 160. The surveyor is observing a display on the survey controller 180, or a like device, which indicates the antenna position and the precision of the measurement as mentioned above. He or she would ordinarily attempt to orient the pole so that the antenna phase center 340 is located directly over ground point 310 without any deviation from verticality. The distance between the phase center 340 and the contact end 166 of the pole would then be subtracted from the antenna position by software in the survey controller 180 when calculating the elevation of ground point 310. At the instant shown in FIG. 3 however, the range pole is at an angle which is several degrees from vertical. A single position measurement recorded at this point would incorrectly indicate the position of point 310 as that of point 330, which is displaced several centimeters horizontally and is lower than the intended point 310.

Figure 4:
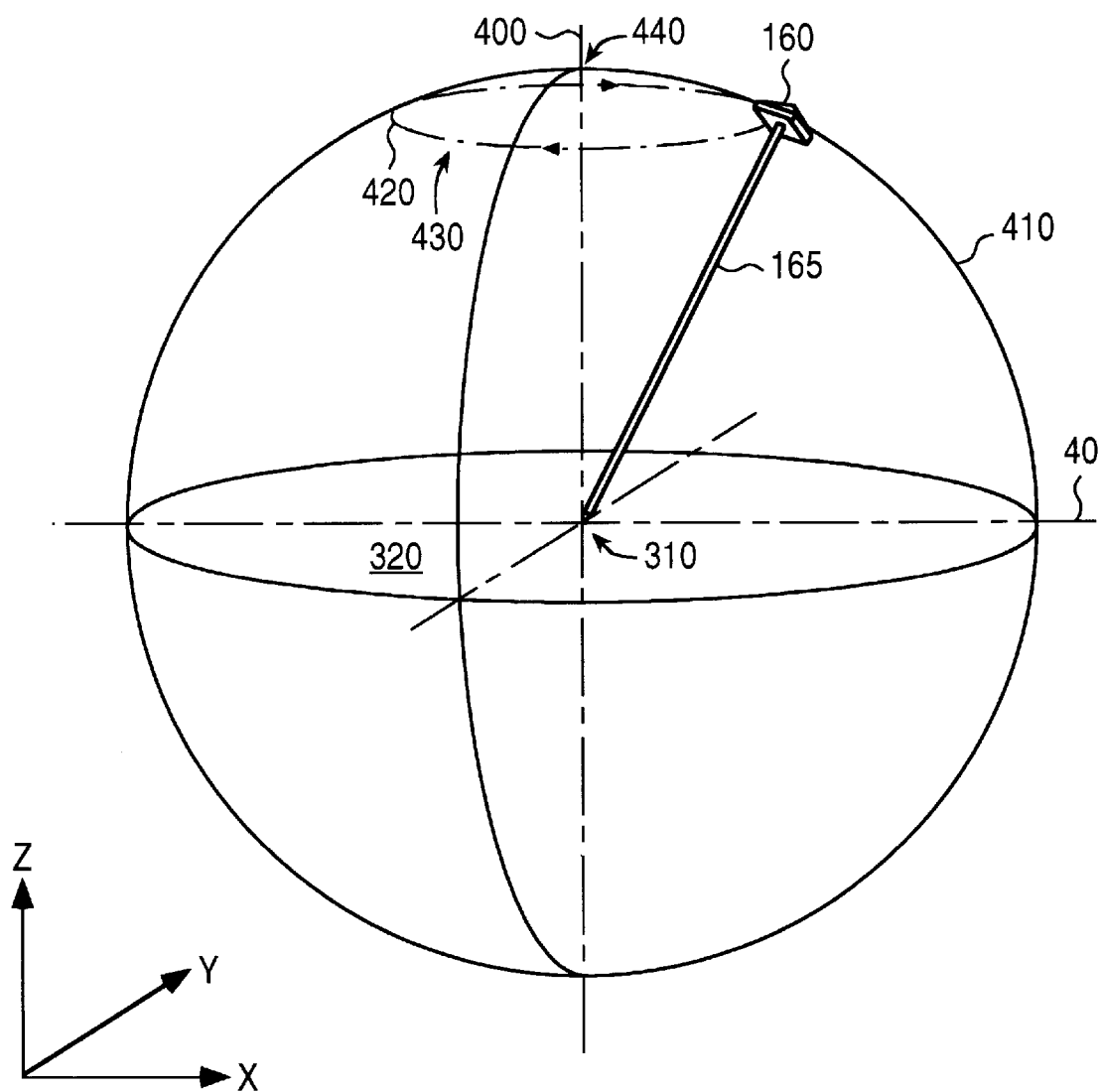
FIG. 4 indicates a range of antenna positions on the surface of a sphere defined by orienting or pivoting the pole about the ground point according to the invention.

FIG. 4 indicates schematically how the surveyor in FIG. 3 may determine the position of ground point 310 according to the invention. The contact end 166 of range pole 165 is held fixed on the ground point and the pole is swung through various angles about vertical. This movement will generally start and finish with the pole in an approximately vertical orientation as indicated by dashed line 400 although the path taken between these positions could be highly irregular. As the length of the pole does not vary during this process the phase center of antenna 160 follows a line on the surface of a sphere 410 which is centered about the ground point 310. The pole 165 may take any orientation during the movement provided that satisfactory signals can be received by the antenna from the satellites 330. For example, the pole should not approach the ground 320 too closely, in order to maintain the antenna in an appropriate attitude for signal reception and to avoid multipath effects. Most convenient for the surveyor is usually an even rotation of the pole about a radius of the sphere 410 to trace an inverted cone having an apex on the ground point. When the pole rotates about vertical line 400 for example, the antenna follows a generally horizontal circle 420 on the sphere. This would create a plurality of measurement points 430 around the circle and preferably include at least one measurement at point 440 with the pole in an approximately vertical orientation. A series of arc like movements is also convenient although in general the path taken by the phase center 340 may vary irregularly and randomly over the sphere.

The surveyor will typically rotate the pole at up to about arms length when moving the antenna in an approximately circular fashion as indicated by circle 420. Given a typical pole length of about 2 m, the radius of circle 420 is preferably between about 0.4 and 0.9 m and most preferably between about 0.5 and 0.8 m. These radii correspond to a range of angles from vertical of preferably about 11 to 24° and most preferably about 14 to 21°. In practice as the angle from vertical decreases there is a corresponding decrease in accuracy of measurement of the ground point position 310. As the angle increases there is an increasing likelihood that the number of satellites visible to the antenna will drop below the required minimum. The significance of these factors will depend on the environment in which measurements are made, the accuracy of the roving equipment, and the accuracy which is required in the resulting position coordinates.

Sphere 410 is characterized by four variables in a global or local coordinate system such as that indicated by three Cartesian axes XYZ. These variables are the three coordinates of the center of the sphere, which corresponds to ground point 310, and a radius which corresponds to the length of range pole 165. To determine all four variables requires at least three independent positions of the antenna to be measured on the sphere, and a separate estimate of the length of the range pole, which is preferably input first to the survey controller 180. At least four accurate measurements of the antenna position would be required in the absence of a pole length measurement. In practice, at least a dozen measurements of the antenna position are taken automatically in a matter of seconds and analyzed in a statistical approximation algorithm, such as least squares adjustment which will be described below. Currently available receivers such as the Trimble 4000 Series are able to generate measurements from the satellite signals at rates of 2 Hz and better. This enables a surveyor to record position information for each site in an interval of 5 to 30 seconds which is comparable to the time currently required to orient the pole vertically when taking a single conventional measurement. The survey controller displays the results with an indication of the precision which has been achieved. The surveyor continues to move the range pole as described above until a sufficiently precise result can be recorded.

Figure 5A:
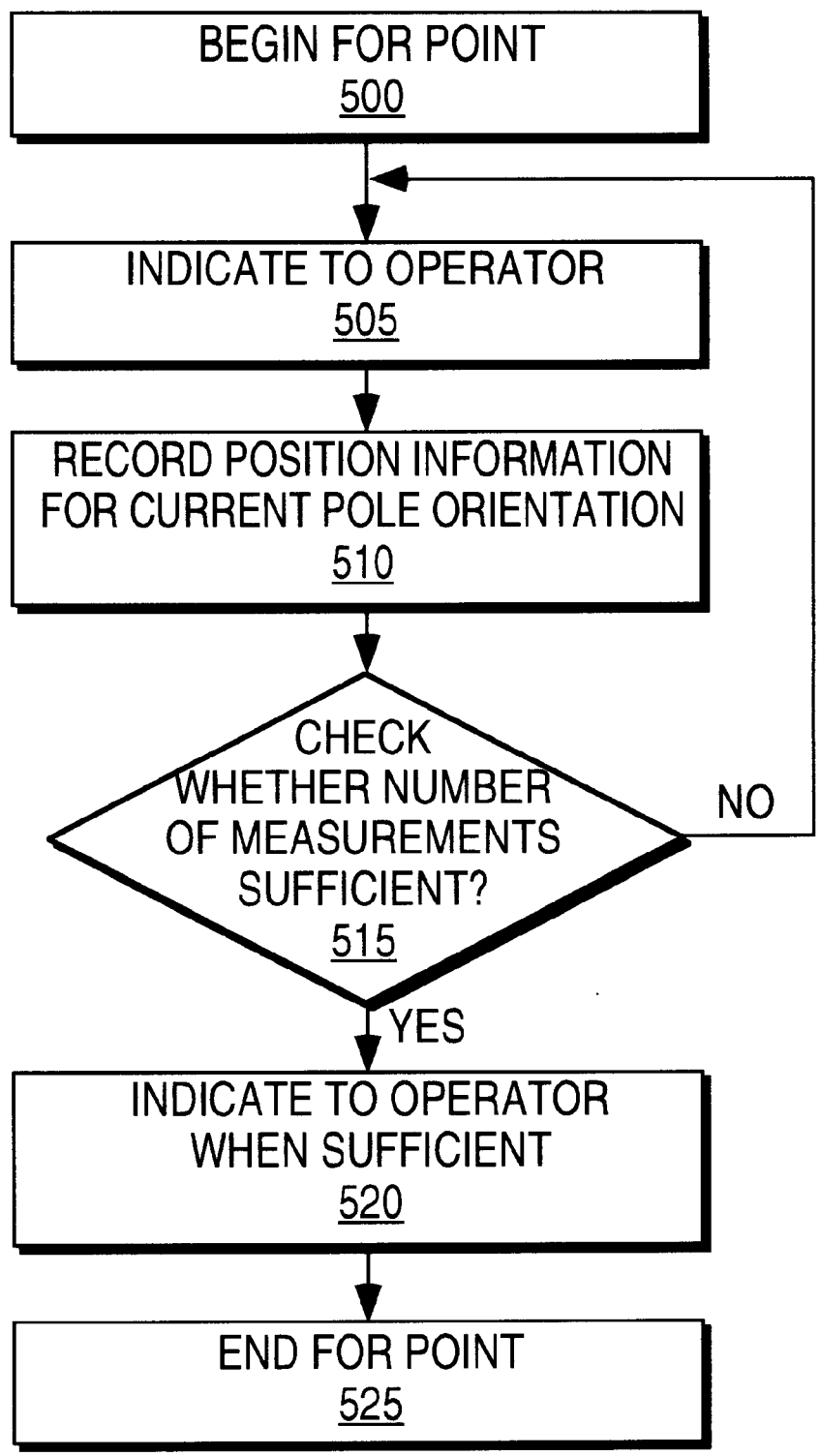
FIGS. 5a and 5b are flow diagrams illustrating respectively how antenna position data may be recorded for post processing or for analysis in real time to determine the ground point position.
Figure 5B:
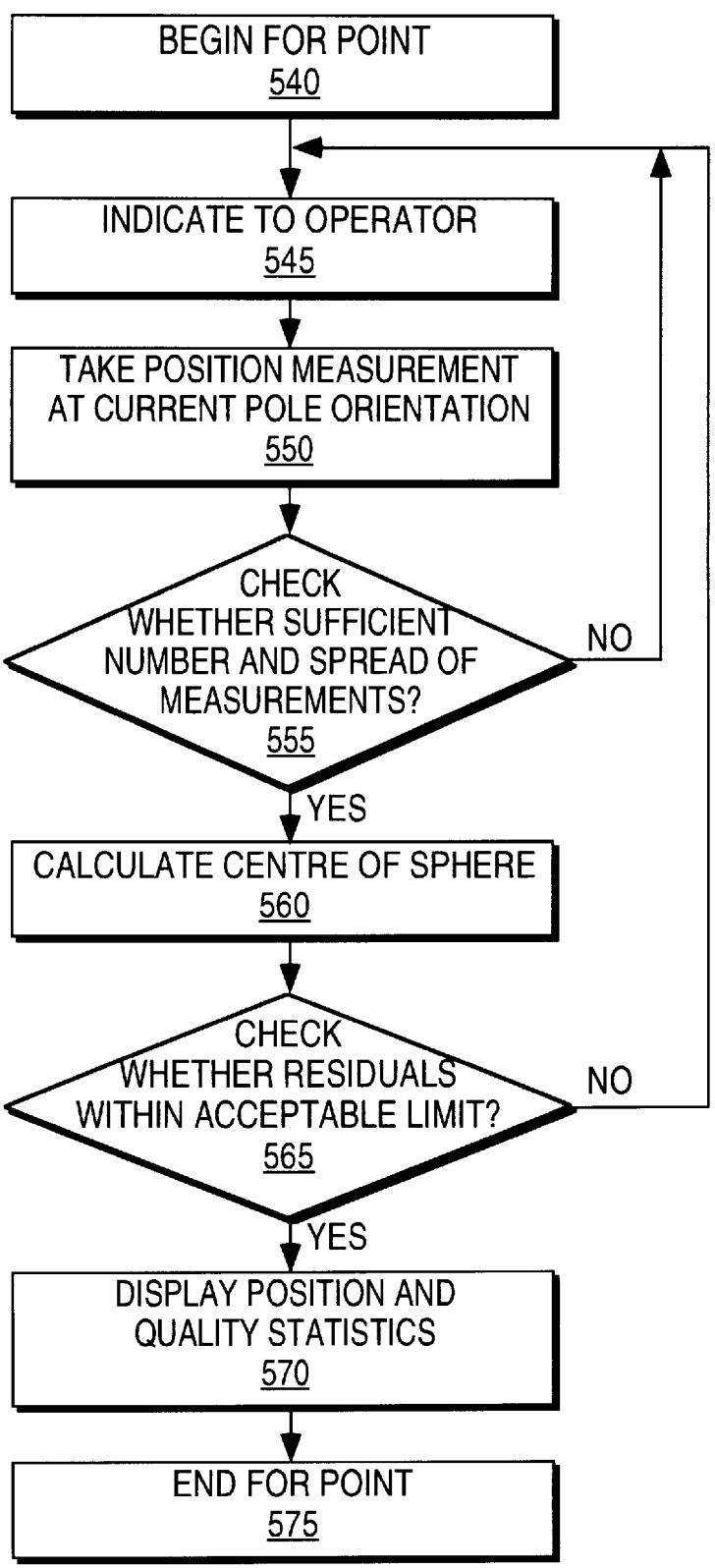

FIGS. 5a and 5b are flowcharts which outline alternative algorithms for the roving station during a determination of position information for a particular ground point. These algorithms may be implemented by software in either the controller 180 or possibly the receiver 140, with the measurement data being stored for post processing as in FIG. 5a, or processed in real time as in FIG. 5b, according to the survey technique in use at the time. Collection of data for post processing does not involve calculation of the center of the sphere in FIG. 4 to determine the actual position of the ground point. FIG. 5a therefore shows no equivalents to steps 560 and 565 in FIG. 5b, as these take place elsewhere during post processing or subsequent analysis such as mapping. In general however, both the operation of software and storage of data will preferably and normally take place in the controller, which interacts with the receiver at appropriate times to determine position data for a series of positions of the moving antenna. Operation of the base and roving receivers themselves when analyzing signals from the satellites is well known in the art and need not be described. Reference may be had to the text mentioned above if required, or to the manuals which are provided with commercially available receiver apparatus.

In the post processing technique FIG. 5a, the surveyor indicates 500 through the controller keypad that data collection for the current ground point 310 should begin. He or she may be prompted by the controller 180 to input attribute information relating to the geographical nature of the point, and a value for the pole length which could have been altered since the previous point. The surveyor then makes a generally continuous movement of the pole such as described in relation to FIG. 4, while the controller displays status information 505. This information may include the number of accumulated measurements of antenna position as a rough indication of quality or eventual accuracy of the ground point coordinates. Each position recorded by the roving receiver 140 is stored 510 by the controller as generally "raw" data, for subsequent processing in combination with data recorded by the base receiver 100. Once a sufficient number of position measurements have been taken 515, it should be possible to provide a required precision in the eventual ground point calculation, and the controller ceases storage for the current point 525. An appropriate message is displayed for the surveyor 520 who then moves on to the next ground point.

In FIG. 5b, a series of antenna position measurements are processed in real time with ongoing characterizations of the sphere 410 carried out until a predetermined precision in the position of ground point 310 has been achieved. Steps 540 to 555 generally match steps 500 to 515 of FIG. 5a, except that in step 550 the actual positions of antenna 160 are accurately determined by the real time interaction between the base and roving stations. In step 555 the spread of positions is also calculated the ground point position is then calculated 560 as the center of the sphere after a suitable number and spread of the antenna positions have been recorded. A running calculation of the center point might also be carried out. The individual antenna positions could saved for checking later or preferably discarded at this stage to conserve storage in the survey controller or other data collector device. Residuals of the calculation are then compared 565 with threshold values and further measurements are taken if the precision is not sufficient. Otherwise the controller ceases storage for the current point. A message is displayed for the surveyor with an indication 570 of the position and estimated quality statistics which have been determined. The surveyor then terminates the procedure 575 before moving to a subsequent point.

A least squares adjustment procedure is outlined. This may be used in post or real time processing using data collected according to FIGS. 5a or 5b respectively, to compute the center of sphere 410 from a collection of vectors to the recorded positions of the phase center of antenna 160. The procedure is somewhat analogous to that of computing each antenna position from the satellite signals themselves, as known to those skilled in the art. It should be noted that the phase center positions could be considered to define various geometric figures such as inverted pyramids or cones and these also might be used in the analysis. The first measured position is typically used to provide a set of starting coordinates and the solution is linearised around this point, with the coordinates of all other vectors being adjusted into agreement. The first measured position is ideally though not necessarily taken with the pole reasonably close to vertical. Weighting of the vectors is determined a posteriori by way of the correlation matrix, or with a priori estimates which involve a considerably more complicated calculation of the solution. The former weighting scheme will be described here only, for clarity. An indication of the uncertainty in the computed center point can also be obtained by inspection of the residuals which represent the amounts by which each vector has been adjusted.

The length of the range pole for a measurement of the antenna phase center is given by the equation for a sphere in a Cartesian axes such as shown in FIG. 4, namely:

$$f(\bar{x}_i) = \{(x_i-x)^2 + (y_i-y)^2 + (z_i-z)^2\}^{1/2}$$

where $\bar{x}_i = (x_i, y_i, z_i)$ is the position of the antenna phase center
$\bar{x} = (x, y, z)$ is the unknown ground point
$f(\bar{x}_i)$ is the distance between these points.

Taking a first estimate of the ground point position as $\bar{x}_o$ enables the unknown actual point to be written as an adjustment $\bar{x}_i = \bar{x}_o + \Delta \bar{x}_i$ and $f(\bar{x}_i)$ to be expanded as a Taylor series about the estimate point. This leads to a linear approximation d $$f(\bar{x}_i) = f(\bar{x}_o) + \left(\frac{\delta f}{\delta x}\right)_o \Delta x_i + \left(\frac{\delta f}{\delta y}\right)_o \Delta y_i + \left(\frac{\delta f}{\delta z}\right)_o \Delta z_i$$

where $$\left(\frac{\delta f}{\delta x}\right)_o = -\frac{x_1 - x_o}{f(x_o)} \text{ etc.}$$

A linear system for a series of m observations of the antenna phase center may then be formed and written as $$\bar{l} = \begin{pmatrix} f(\bar{x}_o)_1 - L \\ \vdots \\ f(\bar{x}_o)_m - L \end{pmatrix} = \bar{A}\Delta\bar{x}$$

where $\bar{l}$ contains differences of the computed lengths from the estimate
$\bar{A}$ is the design matrix containing the partial derivatives $\Delta\bar{x}$ is a vector containing the m unknown adjustments
L is an initial estimate of the pole length.

In practice the system is over determined because the number of observations m is greater than the number of components of the desired ground point position. The observations are inconsistent due to errors and noise, and a noise vector $\bar{n}$ is added so that $$\bar{l} + \bar{n} = \bar{A}\Delta\bar{x}$$

According to least squares principles a solution of this system is obtained by minimizing $$\bar{n}'\bar{P}\bar{A}\Delta x = \bar{A}'\bar{P}\bar{l}$$

where $\bar{P}$ is the weight matrix containing a posteriori variances.
This leads to the normal equations $$\bar{A}'\bar{P}\bar{A}\Delta x = \bar{A}'\bar{P}\bar{l}$$

which simplify to $$\Delta\bar{x} = (\bar{A}'\bar{P}\bar{A})^{-1}\bar{A}'\bar{P}\bar{l} = \bar{N}^{-1}\bar{\omega}$$

where $\bar{N} = \bar{A}'\bar{P}\bar{A}$ and $\bar{\omega} = \bar{A}'\bar{P}\bar{l}$ The normal matrix $\bar{N}$ and vector $\bar{\omega}$ are readily evaluated and the vector of adjustments or residuals $\Delta\bar{x}$ can then be calculated. The adjustment relating to the initial estimate of the ground point is extracted to yield the best fit ground point $\bar{x}$. The diagonal elements of the inverted normal matrix yield a formal estimate of the precision of the ground point determination as the variance in each component of $\bar{x}$.

A least squares analysis as described above may be implemented in real time, as antenna position measurements $x_1$ are received at each ground point in the field, or after a survey procedure, during post processing of bulk position data or some other subsequent process such as a mapping exercise. A statistical filter could also be applied to the position measurements in either case. In real time, the coordinates x and their variances may be presented to the operator as a running result. The analysis would normally be programmed to halt and store the final result automatically when a desired precision had been achieved. The individual antenna position measurements could also be stored for reanalysis later but would normally be discarded at that stage. In subsequent processing, consecutive portions of the bulk survey data relating to each ground point would need to be selected or otherwise received from storage. Each portion would be filtered before formulating and solving the mathematical system using all of the acceptable measurements. Each ground point position would then be stored without necessarily being displayed separately for the operator, depending on the requirements at the time.

Figure 6:
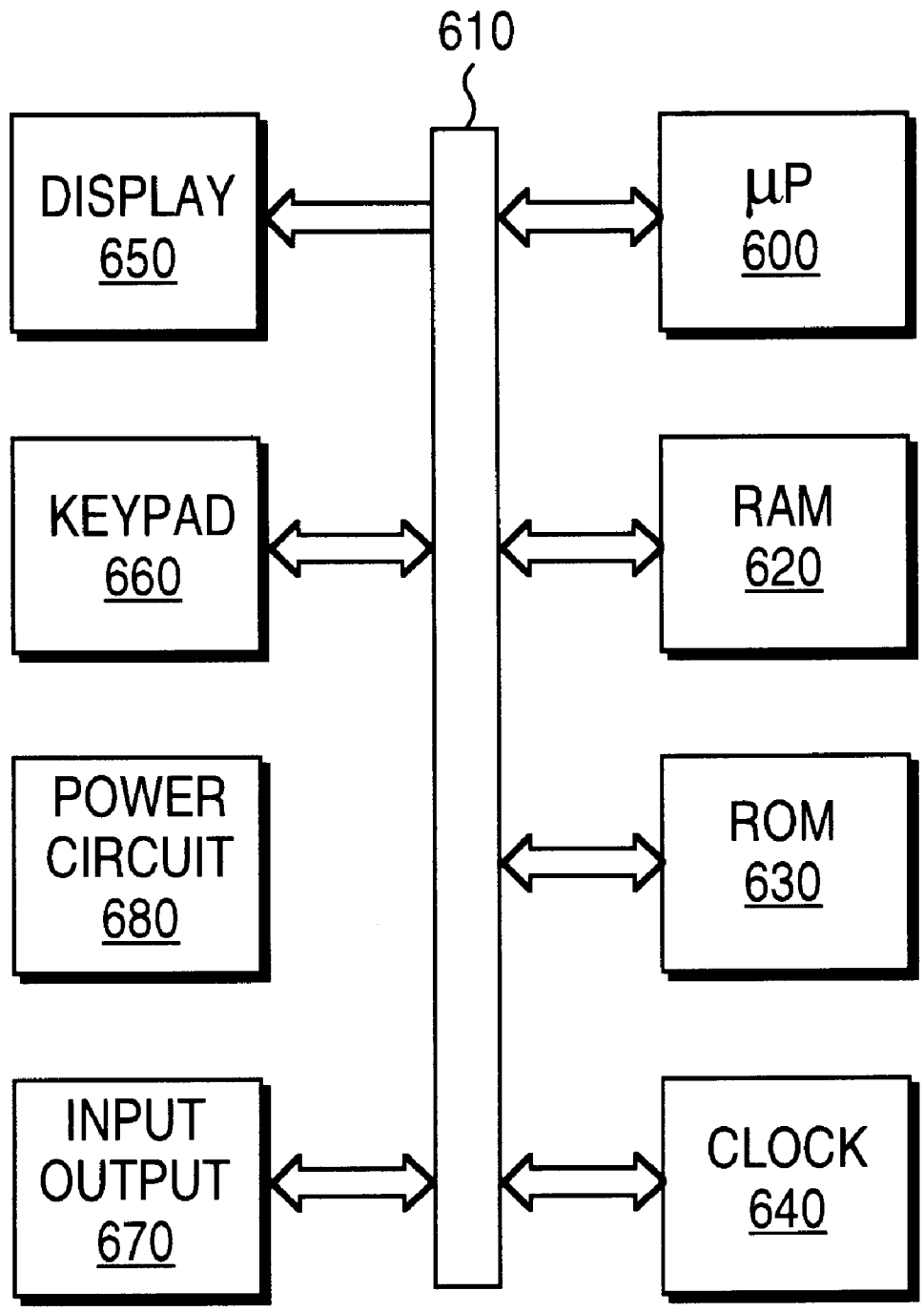
FIG. 6 is a schematic block diagram of a preferred data collector device which may be carried by the surveyor, and in which software enabling recordal and analysis of antenna position information may be implemented.

FIG. 6 is a schematic diagram showing the components of a typical handheld controller device 180, such as the Trimble TDC1, which is part of the preferred roving survey equipment as shown in FIG. 1b. It should be remembered first that equipment of this kind is only one possibility in a variety of receiver, data collector or controller arrangements which might be used in practice when measurements are taken in real time or for post processing. A laptop computer or a combined receiver/collector are example alternatives mentioned above. It should also be remembered that functions of analysis and storage may be distributed between the receiver and controller in a variety of ways. Real time analysis of measurements as shown in FIG. 5b for example, may take place entirely within the receiver with the results being stored in the controller. Alternatively the receiver may output a series of antenna position measurements taken as indicated in FIG. 4 which are then both processed and the result stored in the controller. The receiver could also both analyze and store the results with the controller providing only an interface with the operator. For the purposes of this discussion the relevant electronic components of the controller or receiver, including microprocessor, memory and input/output may be regarded as generally representative of those which are required under any of these circumstances.

The preferred controller devices are of a robust construction and generally incorporate standard electronic components connected to logic such as a microprocessor 600 through system bus 610. The microprocessor stores and retrieves position data and other information from a random access memory 620, and operates as required by a user according to software code stored in a read only memory 630. Clock circuitry 640 provides the timing signals for each component. The microprocessor presents messages to the user on a liquid crystal display 650, and receives manual input through keypad 660. Both the display and keypad, and indeed the other components, may take many forms depending on the complexity of the controller. Input/output interface circuitry 670 allows the microprocessor to upload and download instructions and data from external devices such as the receiver 140 and an office computer. Power is distributed to the controller components by circuitry 680. The power is typically supplied from external batteries 130 through the leads to the input/output ports, although self contained batteries may be provided in some devices.

When the roving station is operating in the field, the algorithms described in relation to FIGS. 5a and 5b, and other functions of the controller 180, are enabled by software stored in the ROM 630 (or in a comparable data collector device, or in the receiver as mentioned above). Position data including raw data or position coordinates generated by receiver 140 and input through the interface 670 during a particular survey is stored in RAM 620. The RAM typically has sufficient capacity to hold data relating to thousands of ground points along with any corresponding descriptive information input by the surveyor. The display 650 presents messages including prompts for input, and appropriate output of the result from each measurement or series of measurements, depending on the survey technique which is being employed. On returning from the field, data and information is downloaded through interface 670, to an office computer for further analysis such as post processing or mapping, as required.

Methods of recording and evaluating position data according to this invention may be used to improve the reliability of manual measurements taken using a range pole in a wide variety of survey techniques of the kind which have generally been mentioned. The methods may be enabled by a range of survey equipment, preferably though not only handheld controllers of the kind which have been described by way of example.

We claim:

1. A method of gathering position data with a pole mounted antenna for use in determining the position of a ground point, comprising:

placing the contact end of the pole on the ground point;

moving the pole through a range of orientations while keeping the contact end on the ground point;

measuring position data for the antenna at a plurality of orientations of the pole using a remote positioning system, wherein the position of the ground point can be determined from the position data recorded through the range at the plurality of orientations; and the position of the ground point is determined from a geometric figure defined by the plurality of antenna positions.

2. The method according to claim 1 wherein a geometric figure is a sphere defined by at least three measured positions of the antenna and a separately measured length of the pole, and the ground point is the center of the sphere.

3. A method of determining the position of a ground point from survey data recorded using a pole mounted antenna and a remote positioning system, comprising:

receiving a portion of the survey data relating to a plurality of antenna positions of the antenna recorded with the pole placed on the ground point;

forming a mathematical system with the antenna positions representing points on a predetermined geometric figure; and determining a further point defined by the geometric figure by evaluating the mathematical system.

4. The method as set forth in claim 3, further comprising the step of storing the further point determined from the geometrical figure as the position of the ground point.

5. A method according to claim 3 further comprising the step of processing the survey data to produce coordinates for the antenna positions.

6. A method according to claim 3 further comprising the step of receiving the survey data as coordinates for the antenna positions.

7. A method according to claim 3 wherein the survey data relates to at least three antenna positions and the length of the pole.

8. A method according to claim 3 wherein the mathematical system is a set of linear equations formed from an equation defining the geometric figure.

9. A method according to claim 3 wherein the geometric figure is a sphere centered on the ground point.

10. A method according to claim 3 wherein the mathematical system is evaluated using least squares principles.

11. A method according to claim 3 wherein the survey data relates to a series of ground points recorded using the pole mounted antenna.

12. A survey apparatus comprising:

a range pole, having a contact end for placing on a ground point;

an antenna mounted on the range pole for receiving positioning signals from a remote positioning system;

a receiver coupled to the antenna for deriving position data from the positioning signals; and logic coupled to the receiver for receiving position data for a plurality of antenna positions while the contact end is maintained on the ground point, the plurality of antenna positions located on a geometric figure wherein a position of the ground point can be determined based on the geometric figure.

13. The survey apparatus as set forth in claim 12, further comprising storage coupled to the logic to store the plurality of antenna positions.

14. The survey apparatus as set forth in claim 12, wherein the position of the ground point is determined as the center of a geometric figure.

15. The survey apparatus as set forth in claim 14, wherein the geometric figure is a sphere having a radius approximately equal to the length of the range pole.

16. The survey apparatus as set forth in claim 12, further comprising an output for loading the plurality of antenna positions to a system that determines the position of the ground point from the plurality antenna positions and the length of the range pole.

17. The survey apparatus as set forth in claim 12, further comprising a telemetry device that is carried with the range pole and receives reference signals when available from stationary references, wherein the receiver further derives antenna positions from the reference signals when available.

18. The survey apparatus as set forth in claim 12, wherein the logic is incorporated in to the receiver.

19. The survey apparatus as set forth in claim 12, wherein the remote positioning system is a satellite positioning system.

20. The survey apparatus as set forth in claim 12, further comprising:

memory coupled to the logic for storing the position data; and an output to download the position data stored in the memory to a device which post processes the position data to determine the corresponding antenna positions and further determines the position of the ground point from the antenna positions.

21. The survey apparatus as set forth in claim 12, wherein said logic determines the plurality of antenna positions from the received position data, said apparatus further comprising:

memory for storing the antenna positions; and an output to download the antenna positions to a device which post processes the antenna positions to determine the position of the ground point.

22. The survey apparatus as set forth in claim 12, wherein said logic determines the plurality of antenna positions from the received position data and determines the position of the ground point from the plurality of antenna positions.

23. The survey apparatus as set forth in claim 12, further comprising an output to download position data to a device comprising a memory and logic, said device storing the position data received from the output in the memory and post processing the position data to determine the plurality of antenna positions and the position of the ground point.

* * * * *

UNITED STATES PATENT AND TRADEMARK OFFICE
CERTIFICATE OF CORRECTION

PATENT NO.    : 5,929,807
DATED         : July 27, 1999
INVENTOR(S)   : Viney et al.

It is certified that error appears in the above-identified patent and that said Letters Patent is hereby corrected as shown below:

In column 1 at line 27 delete "modem" and insert --modern--

In column 13 at line 9 insert --i-- between "logic" and "is"

Signed and Sealed this

Third Day of April, 2001

Attest:

NICHOLAS P. GODICI

Attesting Officer

Acting Director of the United States Patent and Trademark Office